(12) United States Patent
Hoover

(10) Patent No.: US 7,299,584 B2
(45) Date of Patent: *Nov. 27, 2007

(54) TACKLE CONTAINER WITH INTERCHANGEABLE INSERTS

(75) Inventor: Ronald D. Hoover, Baton Rouge, LA (US)

(73) Assignee: Caraustar Industrial and Consumer Products Group, Inc., Austell, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/951,741

(22) Filed: Sep. 28, 2004

(65) Prior Publication Data

US 2005/0097807 A1 May 12, 2005

Related U.S. Application Data

(63) Continuation-in-part of application No. 09/862,939, filed on May 22, 2001, now Pat. No. 6,860,059.

(51) Int. Cl.
*A01K 97/06* (2006.01)

(52) U.S. Cl. ............................. 43/54.1; 43/57.1; 43/57.2

(58) Field of Classification Search ................. 43/54.1, 43/57.1, 57.2, 4.5; 206/315.11
See application file for complete search history.

(56) References Cited

U.S. PATENT DOCUMENTS

| | | | | | |
|---|---|---|---|---|---|
| 228,511 | A | * | 6/1880 | Bray | 43/57.1 |
| 1,790,498 | A | * | 1/1931 | Dewey | 312/244 |
| 1,858,539 | A | * | 5/1932 | Dewey | 312/266 |
| 2,220,817 | A | * | 11/1940 | Holmes | 43/57.1 |
| 2,991,581 | A | * | 7/1961 | Avenire | 43/57.1 |
| 3,133,374 | A | * | 5/1964 | Benson | 43/57.1 |
| 3,182,872 | A | * | 5/1965 | Brosseau | 224/610 |
| 4,238,901 | A | * | 12/1980 | Martinet et al. | 43/57.1 |
| 4,245,422 | A | * | 1/1981 | Souza | 43/57.1 |
| 4,375,137 | A | * | 3/1983 | Chitwood | 43/57.1 |
| 4,958,730 | A | * | 9/1990 | Bunten | 206/315.11 |
| 5,079,863 | A | * | 1/1992 | Gillespie | 43/54.1 |
| 5,228,232 | A | * | 7/1993 | Miles | 43/57.1 |
| 5,606,820 | A | * | 3/1997 | Suddeth | 43/57.1 |
| 5,960,582 | A | * | 10/1999 | Wilkins | 43/54.1 |
| 6,101,760 | A | * | 8/2000 | Garman | 43/57.1 |
| 6,256,925 | B1 | * | 7/2001 | Blackburn | 43/57.1 |
| 6,860,059 | B1 | * | 3/2005 | Hoover | 43/54.1 |

\* cited by examiner

*Primary Examiner*—Teri Pham Luu
*Assistant Examiner*—John Holman
(74) *Attorney, Agent, or Firm*—Summa, Allan & Additon, P.A.

(57) ABSTRACT

The invention is a tackle container that incorporates interchangeable inserts. The inserts secure different kinds of fishing lures and baits. For example, the inserts hold segmented lures within notched upright posts. In this regard, the inserts may be suitably structured to hold spinner bait lures, buzz bait lures, or other fishing lures with segmented bodies. Moreover, the inserts are interchangeable to facilitate a wider variety of uses for the tackle container.

15 Claims, 10 Drawing Sheets

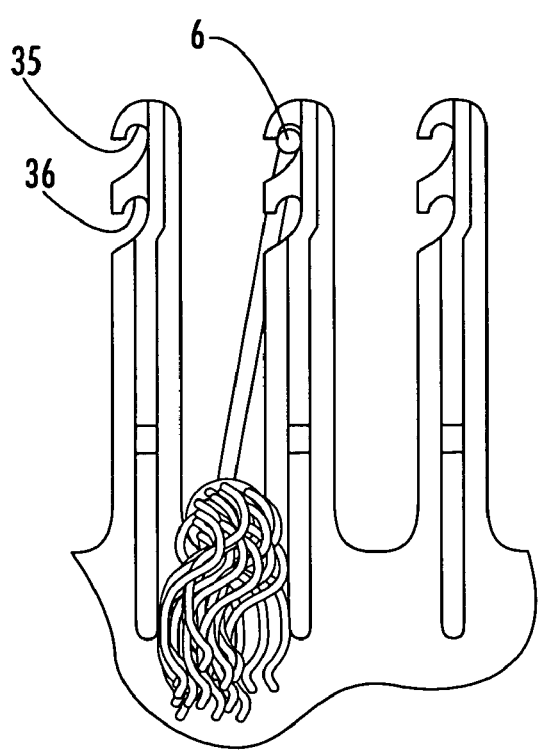 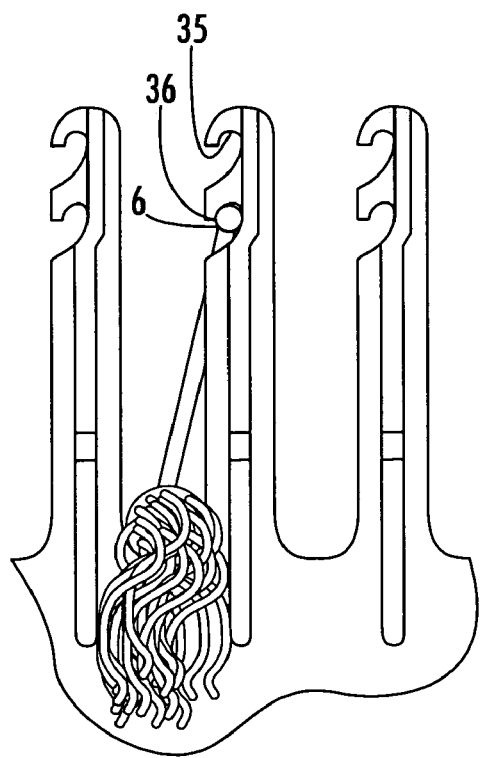
FIG. 5                  FIG. 6

TACKLE CONTAINER WITH INTERCHANGEABLE INSERTS

CROSS REFERENCE TO RELATED APPLICATIONS

This application is a continuation-in-part of application Ser. No. 09/862,939 filed May 22, 2001, for a "Spinner Bait Tackle Organizer with Compression Catches," now U.S. Pat. No. 6,860,059.

BACKGROUND OF THE INVENTION

Fishing enthusiasts consistently face the problem of baits and lures becoming tangled in tackle boxes. Fishing hooks, lures, and various kinds of baits are often made with thin strips of plastic or metal that tend to intertwine with one another, hindering quick retrieval of one piece of equipment from the box. To alleviate this problem, some fishermen divide their tackle boxes into compartments that allow the fishermen to gather similar lures and hooks into a designated section of the container. Within each section of the container, however, lures and hooks still twist around each other and must be manually separated before use.

Previous tackle boxes and containers have been developed in efforts to alleviate the problem of tangled lures and hooks. U.S. Pat. No. 2,220,817 (Holmes, 1939) illustrates the use of grooved slots in a tackle container to separate individual hooks and lures. The Holmes tackle container incorporates a plurality of panels attached to the bottom of the container along a central line so that the panels open outwardly like a fan. Each panel has a series of slots extending vertically from the top edge of the panel into the body of the panel. Either a hook or any curved portion of a fishing lure may slide within one of the slots in the panel to suspend the lure from that slot. The panels therefore provide a multitude of slots to separate individual fishing lures.

Separating fishing lures via grooved slots in tackle container panels is also shown in U.S. Pat. No. 5,606,820 (Suddeth, 1997). The Suddeth patent is designed to organize and hold fishing lures having treble hooks hanging from the underside of the lure. Suddeth provides multiple panels within the container that may be extended vertically from a horizontal position. When the panels are vertically extended, the hooks from the underside of a fishing lure slide into grooves in the panels. The panels are then returned to their horizontal position so that the body of the fishing lure rests on the groove with the hooks hanging underneath the panel. The treble hooks of each lure are separated from the hooks of other lures to prevent tangling. Suddeth also shows a panel in a tackle container having retainer bars from which the treble hooks of the lure may hang to suspend the lure alongside the panel.

U.S. Pat. No. 4,958,730 (Bunten, 1990) shows a tackle box with a plurality of deep storage drawers that slide within an enclosure. The drawers include attachment points from which lures and hooks may be suspended. Depending on the kind of lure, the lure may be positioned so that it is suspended from the top of one of the drawers in a vertical direction. Alternatively, the lure may lie flat in the bottom of a horizontal drawer. For lures that should hang vertically, the storage drawer includes an elastic retaining member supported within the top section of the drawer.

U.S. Pat. No. 5,228,232 (Miles, 1993) also shows a tackle container with divided compartments in which lures and hooks may be organized. Each compartment within the Miles '232 patent incorporates a groove within one of the sidewalls of each compartment. A portion of a fishing lure, such as a wire neck or a thin hook, slides within the groove to hold the fishing lure in place within its compartment. The groove within the compartment sidewall may extend from the top of the sidewall to a midpoint toward the bottom of the container.

Other inventions in the art of tackle containers emphasize individual hooks and ways of preventing the hooks from becoming tangled. U.S. Pat. No. 3,133,374 (Benson, 1964) uses various upright hook holders to individually retain fishing hooks within a container. The Benson '374 patent provides a pair of vertical wire stems that allow a hook to be positioned between the stems. In operation, the Benson hook organizer supports the hook by looping the eye of a hook around one stem and attaching the curved, pointed end of the hook to an opposite stem. The stems of the Benson hook organizer are positioned with enough tension between the two to hold the hook horizontally across the base of the Benson tackle container.

U.S. Pat. No. 6,101,760 (Garman, 2000) provides another mechanism for holding hooks and preventing tangling. The Garman hook organizer also allows easy retrieval of one hook without touching other hooks in the container. The Garman '760 patent shows an organizer in which fishhooks of various sizes may be removably attached between two parallel edges. The edges of the modular hook organizer include a sequence of notches into which the fishhook is pushed in a forced fit. In a typical embodiment of the Garman '760 patent, the shank of a fishhook is held within a pair of notches in two substantially parallel vertical walls of the hook organizer. When installed within the notches, the fishhook is elevated from the bottom of a horizontal portion of the hook organizer. The curved hook end of the fishhook is also snapped into a notch in the horizontal portion of the hook organizer. The Garman '760 patent, therefore, discloses a hook organizer that provides at least three contact points for a fishhook-two notches within vertical walls of the organizer and one notch within a horizontal floor. Each organizer in the Garman '760 patent may have connecting elements that allow the user to connect more than one organizer in a modular fashion.

Another example of tackle containers providing individualized holders for specialized baits and lures is U.S. Pat. No. 6,256,925 (Blackburn '925). The Blackburn '925 patent uses individual enclosures to hold each lure and is particularly useful for holding spinner baits. Each individual enclosure is an upright rectangular box with an extra cavity formed in the top of the box by a triangular attachment extending from the front wall of the enclosure. The triangular attachment includes a groove pointing downward toward the bottom of the box. A spinner bait fits within the enclosure with one segment of the spinner bait extending downward into the upright box as a second segment of the spinner bait fits across the triangular attachment at the top of the enclosure. The second segment of the spinner bait is compressed toward the segment in the box so that the second segment fits within the groove in the triangular attachment. The spinner bait is held within the enclosure by a force of compression between the two segments.

U.S. Pat. No. 4,245,422 (Souza, 1981) discloses a tackle box with a pullout stacking tray structure in which the individual trays are connected to the walls of the container by pivoting links. The container includes vertically hanging attachment walls on the sides of the stack of trays. Each attachment wall includes a plurality of projecting screws from which fishing lures may hang. In one embodiment of the Souza '422 patent, three projecting screws are arranged in a triangle. A spinner bait lure may be balanced at the elbow between lure segments so that one segment is supported by a lower screw as the opposite segment rests on a screw directly across from the lower screw.

U.S. Pat. No. 5,960,582 (Wilkins, 1999) shows another vertically hanging attachment wall within a tackle container for securing spinner bait lures. The Wilkins '582 patent uses a screw that projects from one wall of the container to balance a spinner bait at the elbow between lure segments. The weight of a spinner bait lure is unequal on opposite sides due to different components attached to each segment. The weight difference on either side can possibly lead to the lure sliding around and falling off the projecting screw. The Wilkins '582 patent incorporates retaining walls on either side of the projecting screw to stop movement of the spinner bait lure and retain the lure in a convenient position.

SUMMARY OF THE INVENTION

It is an object of the present invention to provide a tackle container that is capable of storing different kinds of fishing lures and baits within a single container.

It is another object of the present invention to provide a tackle container with a structure that secures lures and baits with segmented bodies inside the container so that the container may be carried and moved without tangling the lures and baits.

It is yet another object of the present invention to provide removable inserts that fit within the tackle container of this invention to provide a storage structure for different kinds of fishing lures and baits.

The invention herein meets these objects by providing a tackle container that incorporates appropriate inserts therein to hold segmented lures in a fixed position. The inserts comprise a lure retainer with notched posts that secure one segment of the lure while a second segment of the lure lies on the base of that insert. The inserts are particularly structured to accommodate spinner bait lures and buzz bait lures within a tackle container to prevent tangling of the lures therein. The inserts are interchangeable so that one container may be used to store a single kind of lure or different kinds of lures at the option of the user.

BRIEF DESCRIPTION OF THE DRAWINGS

FIG. 5 is a sectional view of the lure retainer post of a spinner bait insert according to the invention herein with a spinner bait lure installed in the uppermost notch.

FIG. 6 is a sectional view of the lure retainer post of a spinner bait insert according to the invention herein with a spinner bait lure installed in the lower notch of the post.

DETAILED DESCRIPTION

Figure 1:
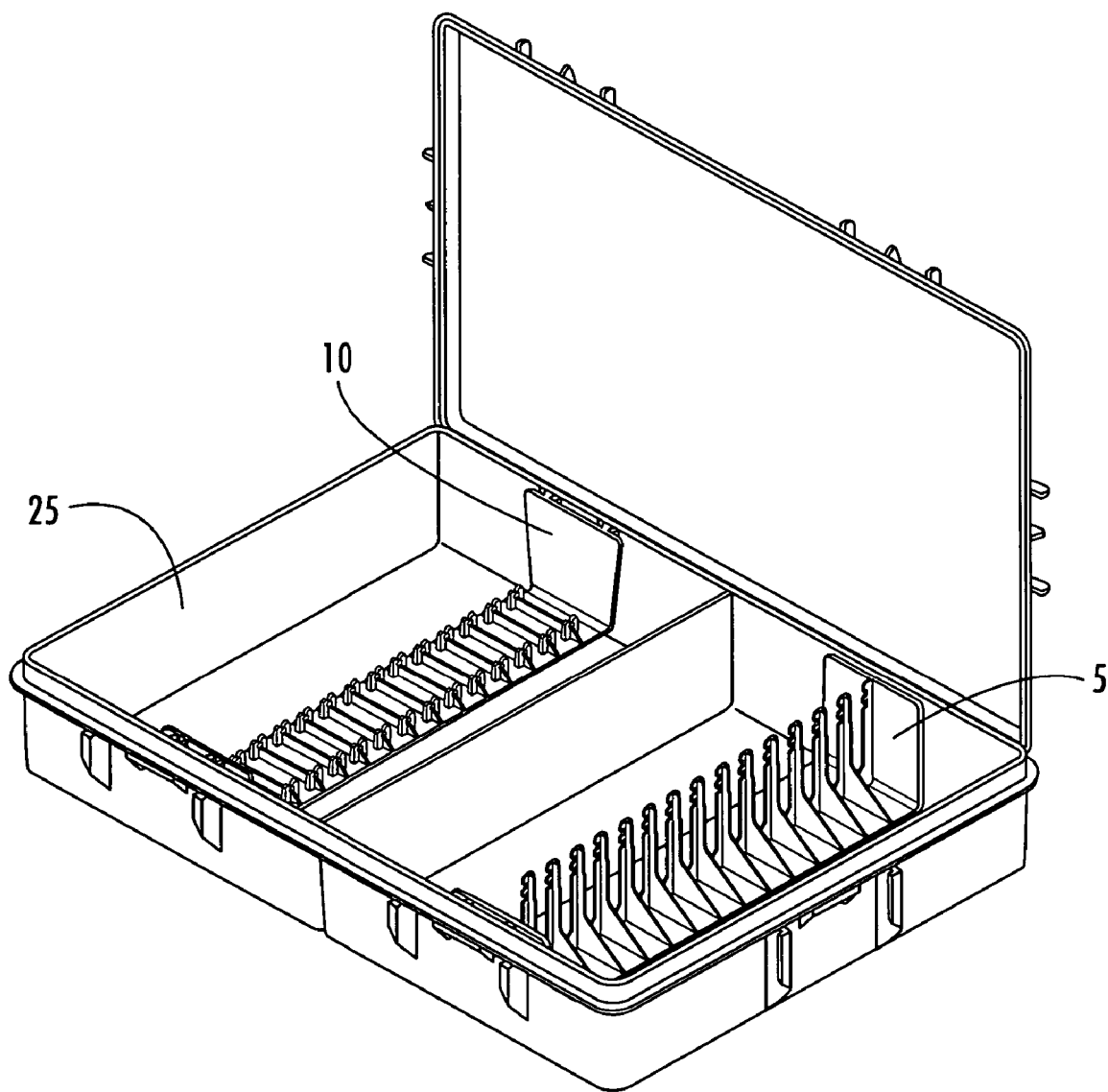
FIG. 1 is a plan view of a tackle container according to the invention herein with inserts installed on either side of a partition.
Figure 2:
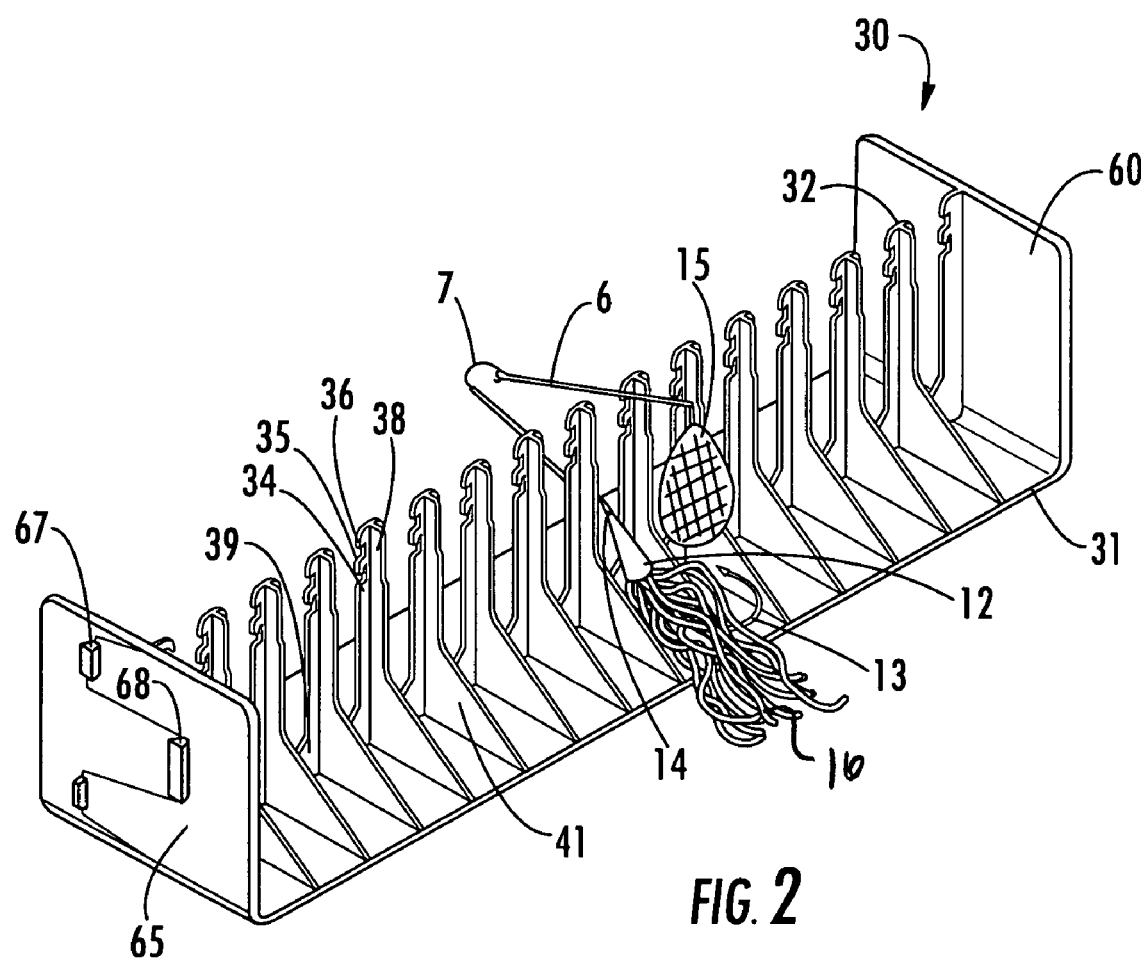
FIG. 2 is a plan view of a spinner bait insert according to the invention herein.
Figure 3:
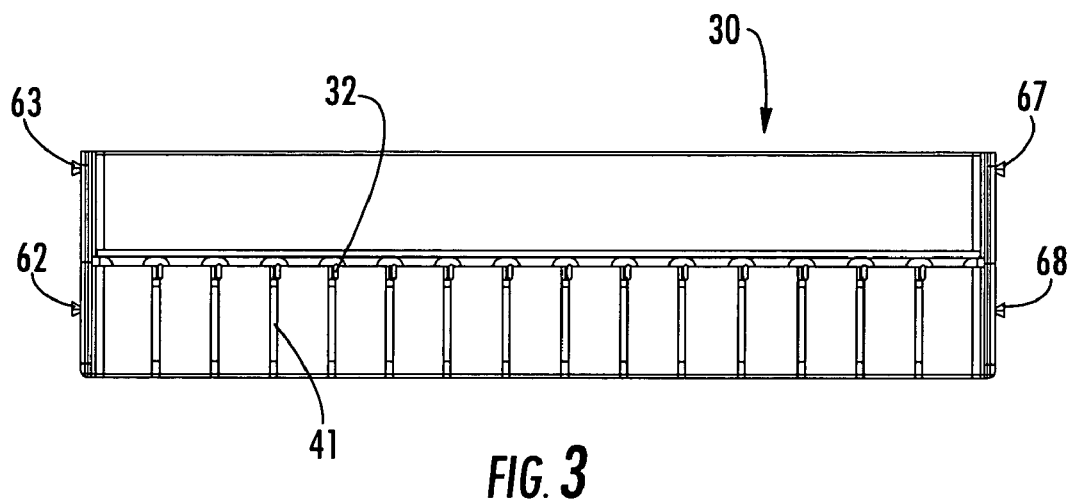
FIG. 3 is a top view of the spinner bait insert according to the invention herein.
Figure 4:
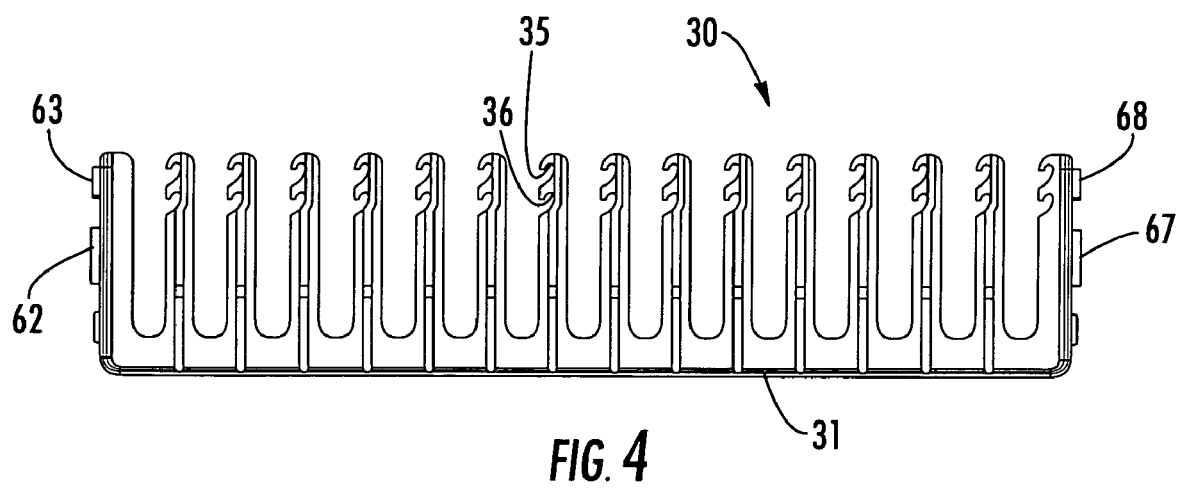
FIG. 4 is a front side view of the spinner bait insert according to the invention herein.
Figure 7:
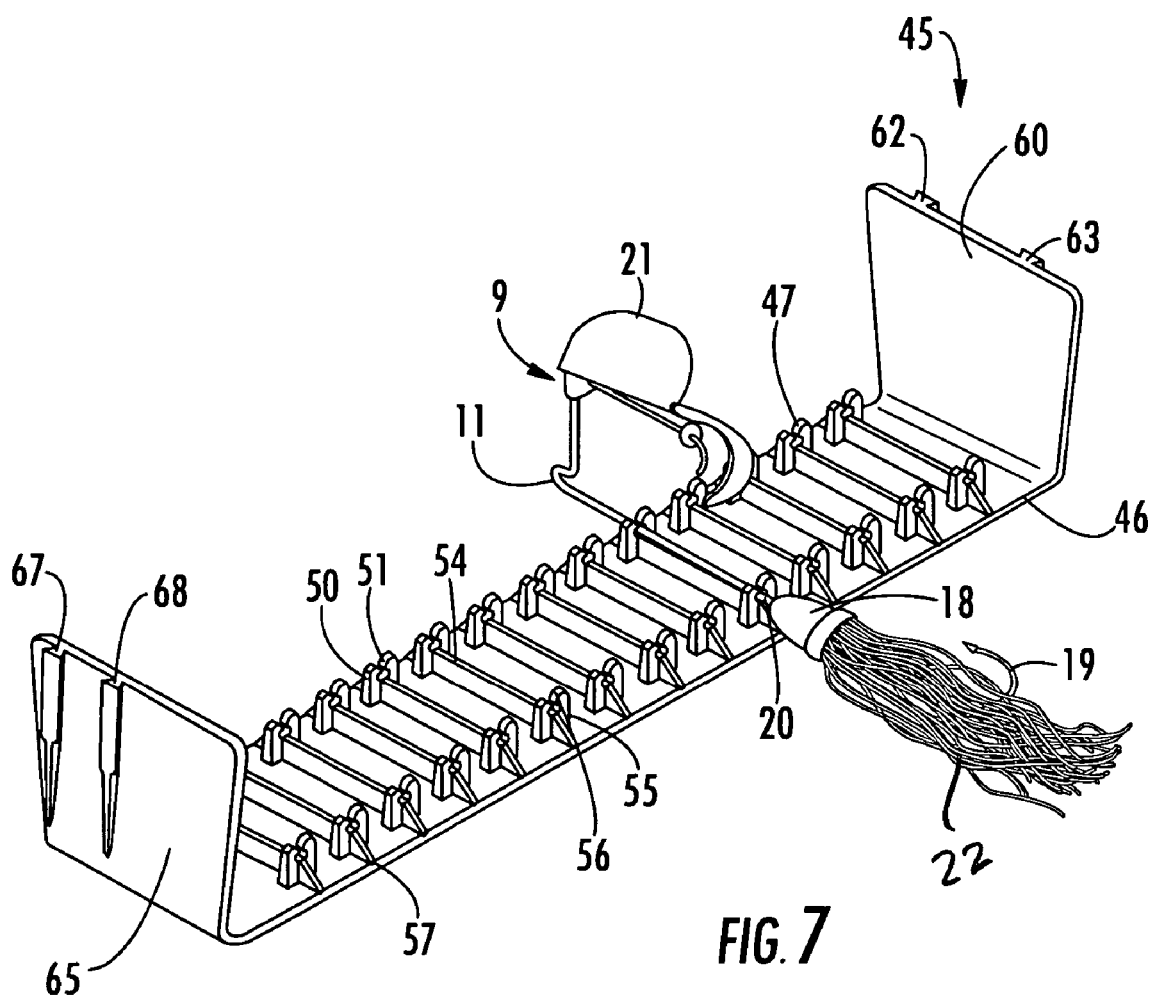
FIG. 7 is a plan view of the buzz bait insert according to the invention herein.

FIG. 1 shows inserts (5, 10) for placing inside a fishing lure container (25) to hold lures having segmented bodies. Fishing lures with segmented bodies include, but are not limited to, spinner baits (6) and buzz baits (9). A typical spinner bait, as shown in FIG. 2, comprises a V-shaped wire portion with an elbow (7) at the vertex that allows for compression of the wires without causing deformation of the lure. The elbow (7) is also known as an R-bend. A buzz bait, as shown in FIG. 7, is similarly made of a wire that is bent at an elbow (11) separating two segments. A typical fishing lure also has a head (12, 18), a hook (13, 19), a neck (14, 20), a skirt (16, 22) and a blade (15, 21).

Lures may be organized and secured in a container (25) that is conveniently carried or otherwise transported during use. Apparatuses for organizing and securing segmented lures in convenient containers are shown in FIGS. 2 and 7. The apparatuses are inserts for placing inside fishing lure containers (25) to hold lures having segmented bodies (6, 9). According to the invention herein, inserts for holding segmented fishing lures each include a base (31, 46) and a lure retainer (32, 47) connected to the base (31, 46). The base (31, 46) may be substantially flat (i.e., planar). The lure retainers (32, 47) each have an upright, substantially perpendicular post (34, 50) with notches (35, 51) defined within the post. The lure retainers (32, 47) further include channel barriers (38, 54) extending substantially perpendicularly from each post (34, 50) across a respective base (31, 46) of an insert (30, 45). The post (34, 50), the channel barrier (38, 54), or both may be connected to the base (31) of the insert (5, 10).

Each notch (35, 51) in a respective post (34, 50) secures one segment of a lure (6, 9) above the base (31, 46) of the insert (30, 45). The lure retainer (32, 47) positions the lure so that a second segment of the lure (6, 9) rests on the base (31, 46) of the insert (30, 45) alongside the channel barrier (38, 54). The unique arrangement of a base (31, 46), a lure retainer (32, 47), a notched post (34, 50), and a channel barrier (38, 54) provides an insert that is highly suitable for securing fishing lures with segmented bodies inside a portable container (25).

One insert (30) according to the invention herein is particularly useful for holding spinner baits (6) in a container (25). FIGS. 2-6 illustrate the spinner bait insert. The spinner bait insert (30) has a post (34) with the notch (35) defined within the side edge of the post (34). The notch (35) preferably has an upward orientation from the side of the post (34) toward the top edge of the post (34). The post may define more than one notch (36) in the side edge as necessary to accommodate lures of varying sizes. The spinner bait insert (30) includes the notch (35) in the side edge of the post

(34) so that a spinner bait lure (6) may be compressed between the notch (35) and the base (31) of the insert (30). As shown in FIGS. 5 and 6, when a spinner bait lure (6) is positioned within the lure retainer (32) by compressing an upper segment of the lure (6) into the notch (35) in the side of the post (34), a lower segment of the spinner bait lure lies along the base (31) beside the channel barrier (38).

The channel barrier (38) of the spinner bait insert (30) extends substantially perpendicularly from the lure retainer post (34). In one embodiment the channel barrier (38) extends outwardly from near the top of the post (34) and connects to the base (31) of the insert (30). The channel barrier (38) also may include a triangular shaped gusset (41) that provides support between the post (34) and the base (31) of the insert (30).

A spinner bait insert (30) may incorporate a plurality of lure retainers (32), positioned side-by-side, with each lure retainer (32) being connected to the base (31) of the insert (30). The side-by-side lure retainers (32) form a series of channels between adjacent channel barriers (38). In this configuration, one insert (30) may hold multiple spinner bait lures (6). Each spinner bait lure (6) is compressed so that one lure segment fits within a notch (35) in a respective lure retainer post (34), and another segment of that lure (6) lies within a channel formed by adjacent channel barriers (38). The notch (35) holds the lure in place by a downward compressive force, and the channel barriers (38) prevent the lure from moving side to side. The insert (30) provides a mechanism for organizing spinner bait lures (6), securing the lures in a fixed position, and maintaining the lures in an organized arrangement when the user transports the lures in a portable container (25).

A spinner bait insert (30) with a plurality of side-by-side lure retainers connected to the base (31) may include neck rests (39) connecting adjacent lure retainers. The neck rests (39) provide support to the necks (14) of spinner bait lures (6) when the lure segments are compressed between the notch (35) of a lure retainer post (34) and the base (31) of the insert (30). The neck rests (39) may be formed into any convenient shape, but U-shaped neck rests (39) are useful for securing rounded lure necks (14).

Figure 8:
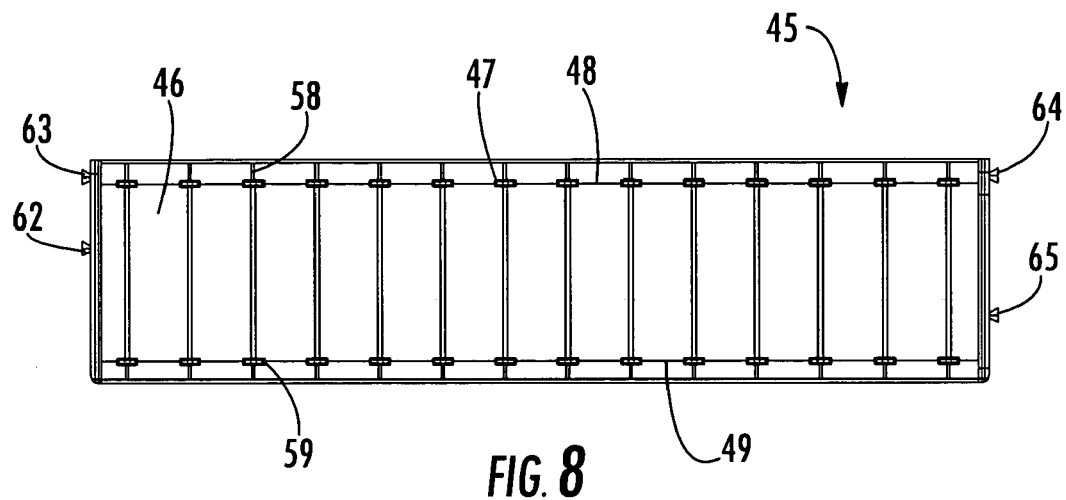
FIG. 8 is a top view of the buzz bait insert according to the invention herein.
Figure 9:
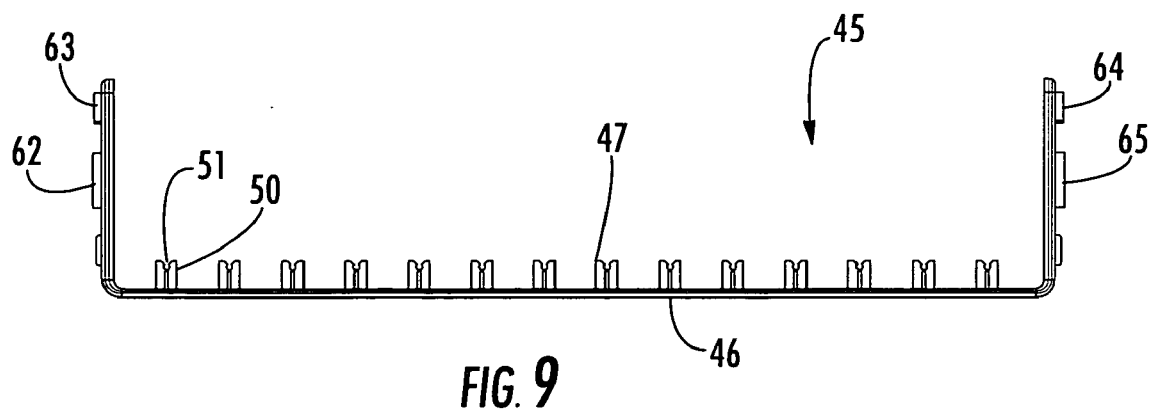
FIG. 9 is a front side view of the buzz bait insert according to the invention herein.
Figure 10A:
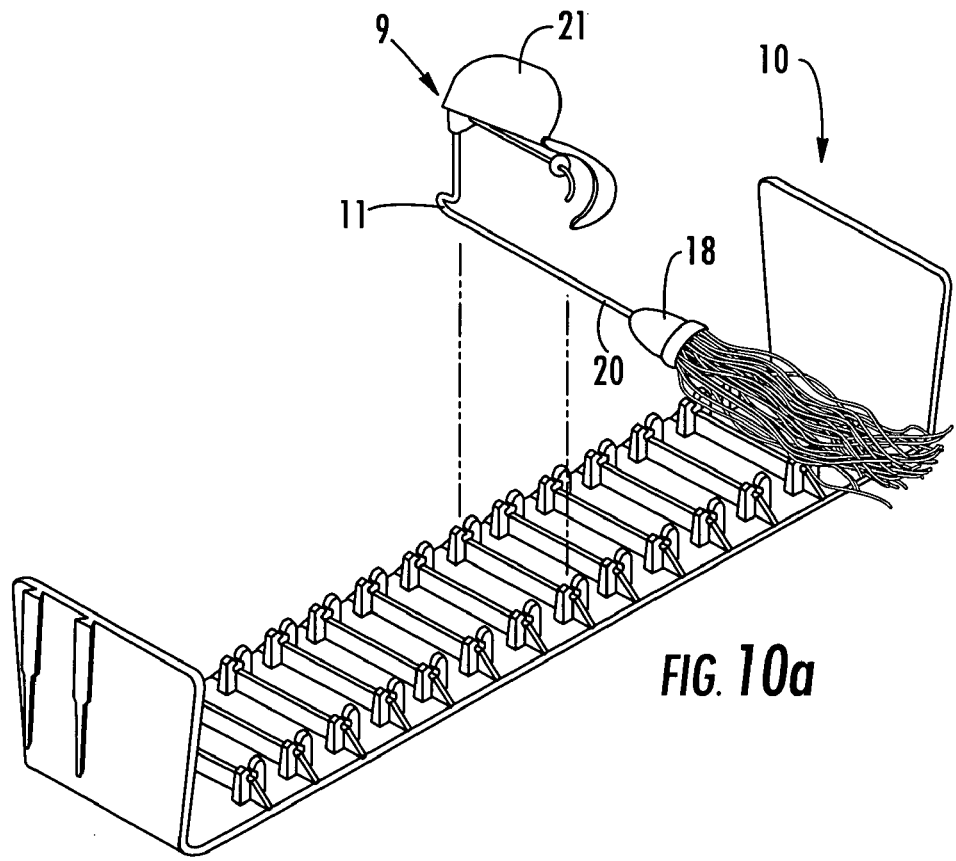
FIG. 10a is a plan view of a buzz bait lure to be installed in the lure retainer post of a buzz bait insert according to the invention herein.
Figure 10B:
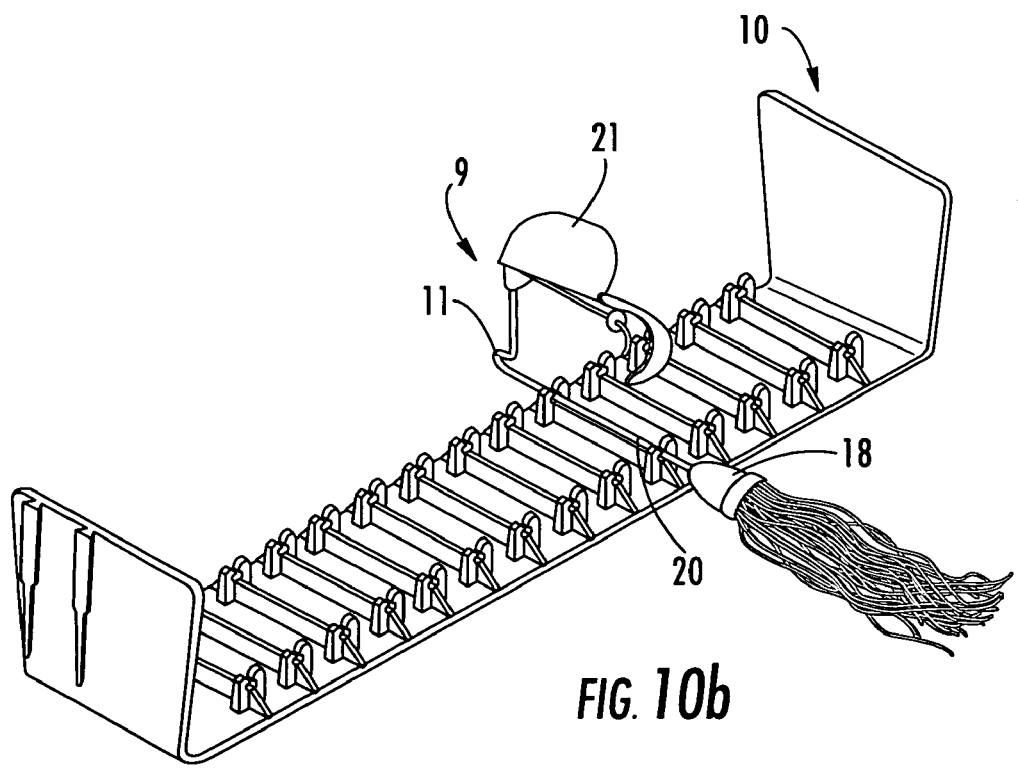
FIG. 10b is a plan view of a buzz bait insert with a buzz bait lure installed within the lure retainer post and the corresponding post of the insert.

The inserts of this invention may also be configured to efficiently organize buzz bait lures (9) within a fishing tackle container. FIGS. 7-9 show the details of the buzz bait insert. A buzz bait insert (45) includes certain elements in common with the above-described spinner bait insert (30). In this regard, the buzz bait inserts each include a base (46) and a lure retainer (47) connected to the base (46). The lure retainers (47) also each have a substantially perpendicular post (50) defining a notch (51) within the post (50). The buzz bait lure retainers (47) further include channel barriers (54) extending substantially perpendicular from each lure retainer post (50).

In addition to the lure retainer post (50), the buzz bait insert (45) has a corresponding post (55) attached to the base (46) across from the lure retainer post (50). The corresponding post (55) may be connected substantially perpendicularly to the base (46) of the insert. The corresponding post (55) also defines a notch (56) within the corresponding post (55). In a preferred embodiment, the top edge of the lure retainer post (50) and the top edge of the corresponding post (55) define the respective notches in the post (50) and the corresponding post (55).

The notches (51, 56) in the lure retainer post (50) and the corresponding post (55) are of a size and shape that allow a segment of a buzz bait lure (9) to fit therein. In one preferred embodiment, the notches (51, 56) are generally shaped like a keyhole extending from the top edge into the bodies of the post (50) and the corresponding post (54). The notches in the post and corresponding post (51, 56) may be coaxial to allow the segment of the buzz bait lure to fit therein in a linear position.

One segment of the buzz bait lure (9) fits within the respective notches (51, 56) of the post (50) and the corresponding post (55) such that the lure segment extends across the channel barrier (54). While one segment of the buzz bait lure (9) is held within the notches (51, 56) of the insert (45), the lure (9) is allowed to rotate so that a second segment of the lure (9) lies alongside the channel barrier (54) on the base (46) of the insert.

In one preferred embodiment, the channel barrier (54) extends from the lure retainer post (50) and connects to the corresponding post (55). The channel barrier (54) may also connect to the base (46) as necessary for support. The buzz bait insert (45) may also include triangular-shaped gussets (57, 58) attached to the sides of the post (50) and the corresponding post (54) opposite the channel barrier (54). Each gusset (57, 58) adds support to a respective post (50) and corresponding post (55).

A buzz bait lure insert according to the invention herein may also comprise a plurality of buzz bait lure retainers (47) positioned side-by-side with each lure retainer (47) being connected to the base (46). The side-by-side buzz bait lure retainers (47) form respective channels between each pair of adjacent channel barriers (54). Each buzz bait lure retainer (47) holds one segment of the buzz bait lure (9) within the notch (51) in the post (50) and allows a second segment of the buzz bait lure (9) to rotate and lie in a channel formed by adjacent channel barriers (54).

A buzz bait lure insert having a plurality of buzz bait lure retainers (47) may also include a plurality of corresponding posts (55) positioned side-by-side and connected to the base (46). Each of the corresponding posts (55) is aligned across the base (46) from the post (50) of a respective lure retainer (47). The corresponding posts (55) each define a notch (56) within the corresponding post (55) so that the lure retainer post (50) and the corresponding post (55) hold one segment of a lure within their respective notches (51, 56) as another segment of the lure lies within the channel between adjacent channel barriers (54).

As shown in FIG. 8, a buzz bait lure insert (45) according to the invention herein may include additional features that provide more support and add rigidity to the insert. In this regard, the insert (45) may have a support ridge (48) extending along the base (46) between each lure retainer (47). A second support ridge extends along the base (46) between each corresponding post (55). A similar third support ridge may extend horizontally on the inner surface of each end wall (60, 65).

The tackle container inserts according to the invention herein may also include an end wall (60) connected to the base (31, 46) substantially parallel to the channel barrier (38, 54). The end wall (60) may include a substantially vertical rail (62) opposite the base (31, 46) on the outside of the end wall (60). The end wall (60) may also include a second substantially vertical rail (63) opposite the base (31, 46) on the outside of the end wall (60).

The end wall (60) and its associated rails (62, 63) assist in securing the insert (30, 45) within a container (25). The insert may include a second end wall (65) connected to the end of the base (31, 46) opposite the first end wall (60). Similar to the first end wall (60), the second end wall (65) may have first and second vertical rails (67, 68) opposite the base of the insert on the outside the second end wall (65).

Alternatively, the two end walls (60, 65) and the base (31, 46) of the insert may be formed as a single piece U-shaped construction.

Figure 11:
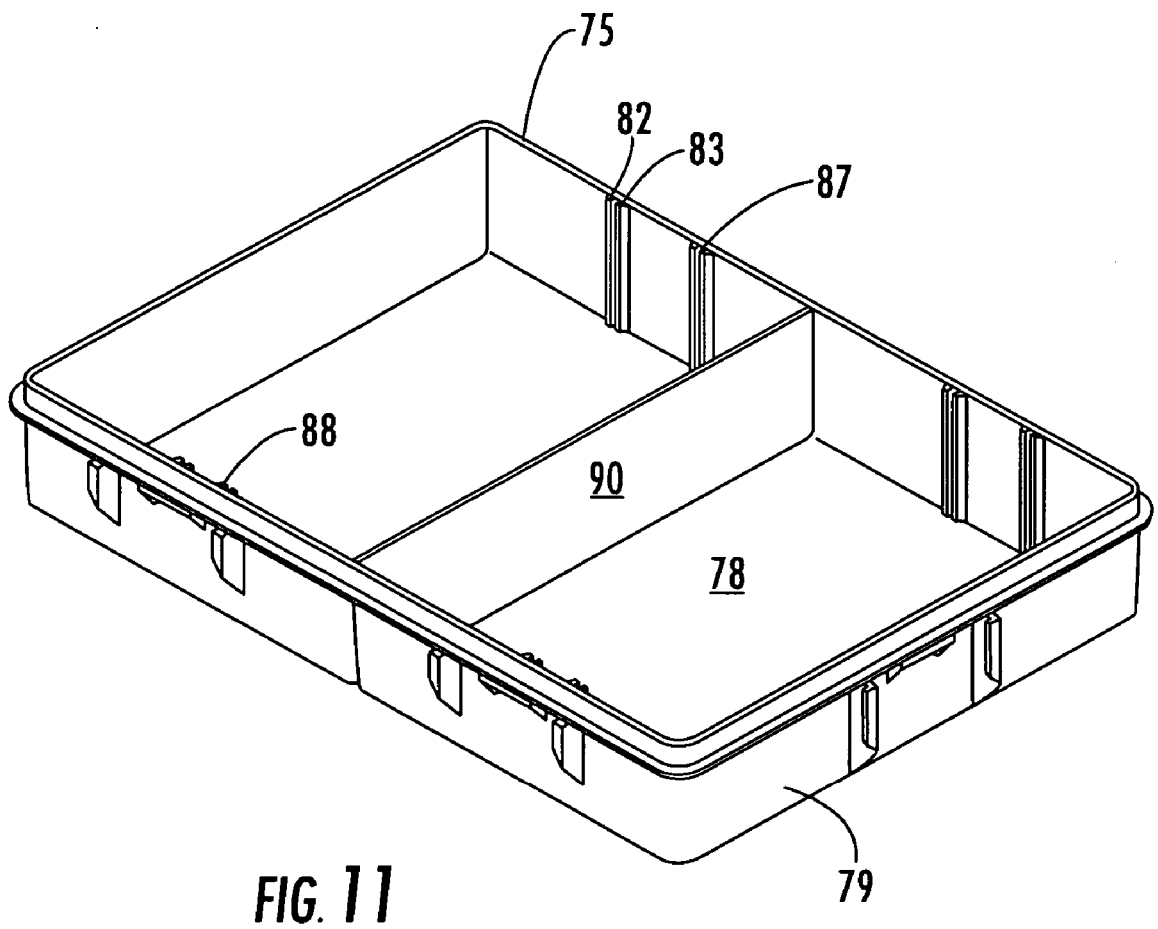
FIG. 11 is a plan view of an open tackle container that is structured to receive the inserts of the invention herein.

The inserts, described herein for organizing various kinds of fishing lures, conveniently fit within tackle containers for carrying multiple lures without tangling the lures. The invention, therefore, encompasses a container, as shown in FIG. 11, that utilizes the above-described inserts for holding and organizing fishing lures with segmented bodies. The container (75) has a bottom (78) with a continuous sidewall (79) connected to the bottom (78). The inserts, particularly the above-described spinner bait and buzz bait inserts (30, 45), removably fit within the continuous sidewall (79).

The sidewall (79) of a container (70), designed to hold fishing lure inserts according to the invention herein, includes a plurality of pairs of substantially vertical ribs (82, 83) that define pairs of aligned slots (87, 88) across the bottom (78) of the container (75) from one another. As described above, the inserts have at least one end wall (60) connected to the base (31, 46) of the insert (30, 45). The end wall (60) has a substantially vertical rail (62) located on the outside of the end wall (60) opposite the base (31, 46) of a respective insert (30, 45). The vertical rail (62) slides between a pair of substantially vertical ribs (82, 83) on the sidewall (79) of the container (75), such that the rail (60) fits within the slot (87) formed by the substantially vertical ribs (82, 83).

The inserts according to this invention may have multiple rails (62, 63, 67, 68) located on the outside of first and second end walls (60, 65). The container (70) is adapted to receive the inserts (30, 45) described herein and hold the inserts securely in place. The pairs of rails (62, 63, 67, 68) on each end wall (60, 65) removably slide between corresponding pairs of ribs (82, 83) on the sidewall (79) to hold the insert in place within the container (70).

Figure 12:
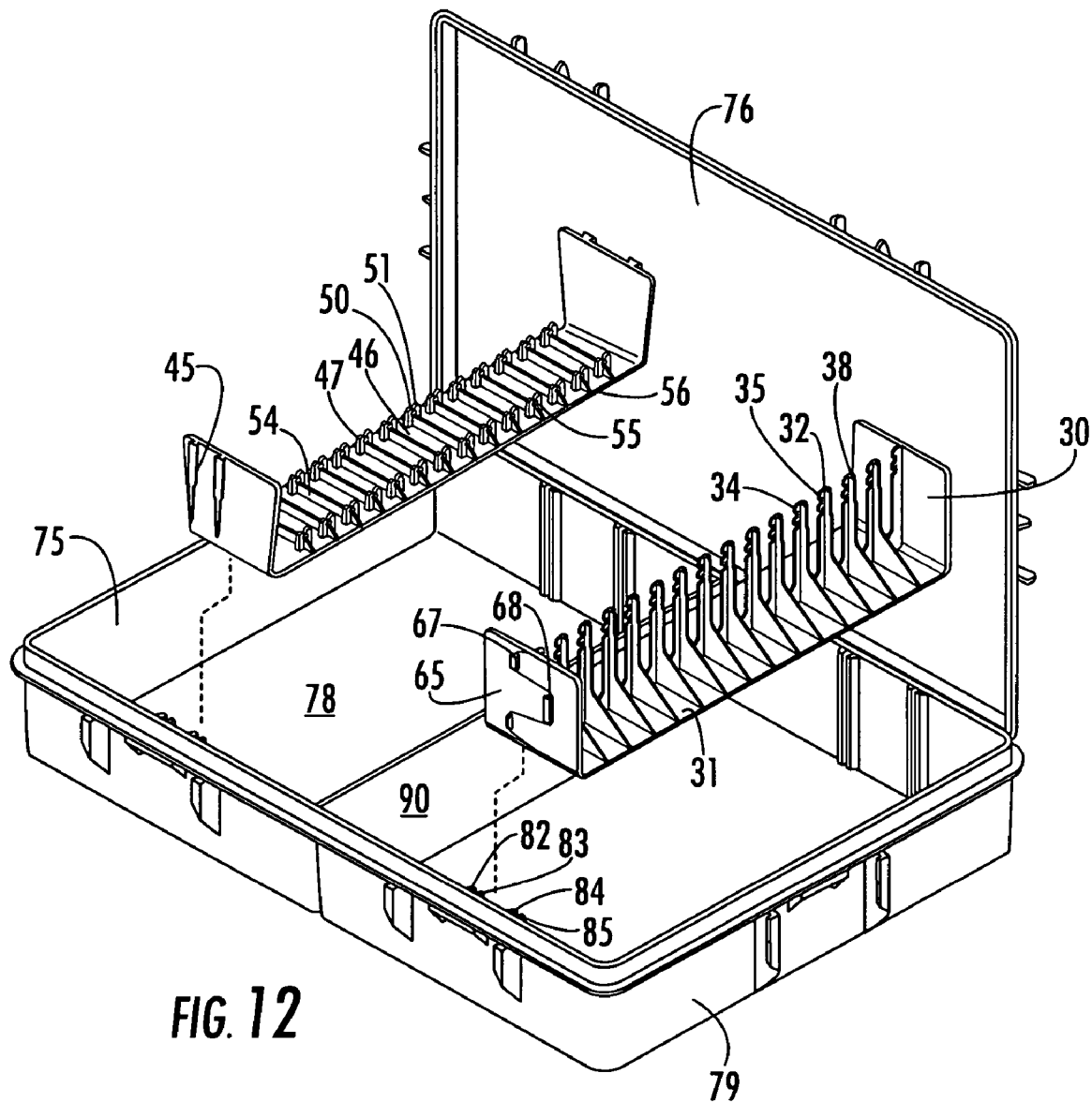
FIG. 12 is a plan view of a tackle container according to the invention herein with a spinner bait insert and a buzz bait insert interchangeably installed therein.

In one preferred embodiment, the container (75) may include a partition (90) extending between opposite sections of the sidewall (79). The partition (90) divides the container (75) into two portions. In this embodiment, at least one insert removably fits within each section of the divided container (75). The different sections of the container (75) are available to install different kinds of inserts in one container (75). For example, as shown in FIG. 12, one section of the container (75) may accommodate a buzz bait insert (45) while an adjacent section of the container (75) holds a spinner bait insert (30). A single container (75) may then be used to organize and carry multiple kinds of lures at once. In this regard, the inserts are interchangeable within the container. The container (75) may include one kind of insert on both sides of the partition (90), or it may include different inserts on either side of the partition.

The embodiment of FIG. 12 shows the above-described container (75) fitted with an insert for holding fishing lures that have a neck, a lower lure segment, and an upper lure segment. The assembly includes a bottom (78), a continuous sidewall (79) connected to the bottom (78), and an insert (30) that removably fits within the sidewall (79). In one embodiment, the insert (30) is particularly suitable for holding and organizing spinner bait lures. The spinner bait lure insert (30) includes a base (31) and a lure retainer (32) connected to the base (31). The lure retainer (32) is a substantially perpendicular structure that includes a post (34) with a notch (35) formed in the post (34). The lure retainer (32) further includes a channel barrier (38) extending substantially perpendicularly from the post (34). The insert (30) may include all the features described above, which will not be repeated but that are incorporated as if set forth fully herein.

The container (75) may include vertical ribs (82-85) along the sidewall (79) for receiving rails (67, 68) positioned on the outside of the end walls (60, 65) of the spinner bait lure insert (30). When assembled in this manner, the base (31) of the spinner bait insert (30) is flush against the bottom (78) of the container (75). The container lid (76) closes over the insert (30) to protect the contents therein. The lid (76) is attached to the container by hinges that are well known in the art of portable containers. The container lid (76) includes a fastening mechanism, including but not limited to, hinged handles that snap into place around the perimeter of the lid (76).

FIG. 12 also shows an assembled fishing lure container according to this invention that includes the buzz bait insert (45) installed therein. Again, the container (75) includes a bottom (78), a continuous sidewall (79) connected to the bottom (78), and an insert (45) that removably fits within the sidewall (79). A buzz bait insert (45) installed in the container (75) has a base (46) and a lure retainer (47) connected to the base (46). The lure retainer of the buzz bait insert (45) is adapted to organize and hold buzz bait fishing lures within a notch (51) in a post (50) extending perpendicularly from the base (46).

The buzz bait insert (45) also has a corresponding post (55) attached to the base (46) across from the post (50) of the lure retainer (47). A channel barrier (54) extends from the post of the lure retainer (47) across the base (46) and connects to the corresponding post (55). The corresponding post (55) defines a notch (56) therein for holding one segment of the buzz bait fishing lure.

In operation, one segment of a buzz bait fishing lure fits within the respective notches of the post (50) and the corresponding post (55) such that the lure segment extends across the channel barrier (54) of the buzz bait insert (45). When one segment of a buzz bait fishing lure is positioned across the channel barrier (54) and resting within the notches of the lure retainer post (50) and the corresponding post (54), a second segment of the lure lies alongside the channel barrier (54).

Figure 13:
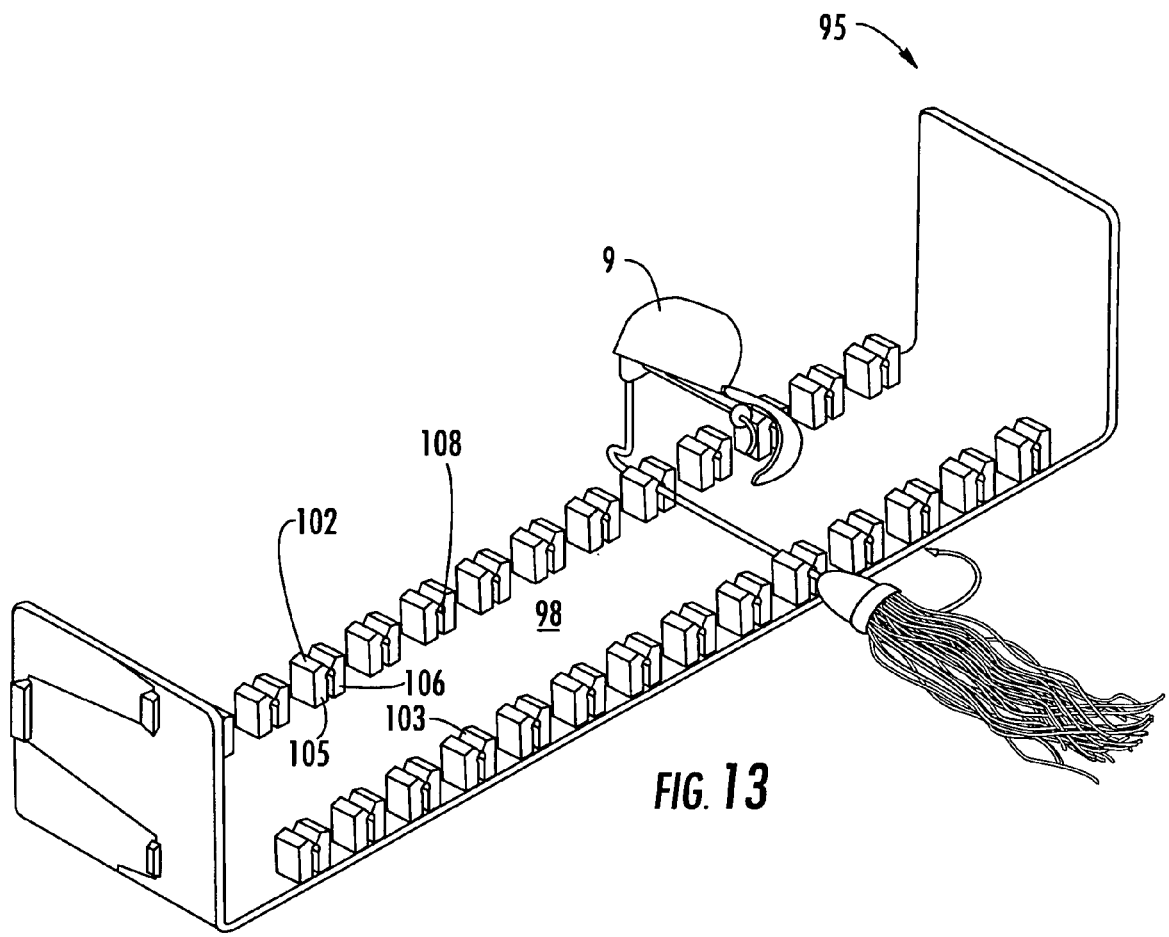
FIG. 13 is a plan view of a buzz bait insert according to the invention herein wherein the buzz bait lure is held within buzz clips attached to the base of the insert.

FIG. 13 shows yet another embodiment of an insert (95), according to the invention herein, that is particularly useful for holding fishing lures having segmented bodies. This embodiment fits within a container (75) as previously described. The container (75) has a continuous sidewall (79) connected to a bottom (78). The insert (95) that fits within the continuous sidewall (79) has a base (98) and a plurality of pairs of buzz clips (102, 103) attached to the base (98).

A buzz clip (102, 103) has two contoured upright braces (105, 106) positioned immediately next to one another. The contoured braces (105, 106) are essentially mirror images and include rounded inner edges facing each other. The rounded inner edges are positioned to form a holding cavity (108) there between. The contoured braces (105, 106) clamp together with sufficient force to remain in a closed position until an opposite force pries the braces apart. A lure segment fits between the braces (105, 106) and will remain in the holding cavity (108) when the braces are in a closed position.

A buzz bait insert (95) according to the invention herein has at least one pair of buzz clips (102, 103) attached to the base (98) of the insert (95). The buzz clips (102, 103) are aligned directly across from one another. A buzz bait lure segment may be secured within the holding cavity (108) of a first buzz clip (102) and extend across the base (98) of the insert (95) so that a second end of the buzz bait lure segment is secured within the holding cavity of an opposite buzz clip (103). In a preferred embodiment, the buzz clips in any given pair include coaxial holding cavities (108, 109) so that the pair of buzz clips (102, 103) open and close along a common axis. A buzz bait lure segment placed within a pair of buzz clips (102, 103) is free to rotate within the pair of holding cavities so that a second segment of the lure lies along the base (98) of the insert (95).

In the drawings and specification, there have been disclosed typical embodiments on the invention and, although specific terms have been employed, they have been used in a generic and descriptive sense only and not for purposes of limitation, the scope of the invention being set forth in the following claims.

The invention claimed is:

1. A container for securing fishing lures having segmented bodies, comprising:
   a bottom;
   a continuous sidewall connected to said bottom;
   an insert that removably fits within said continuous sidewall, said insert comprising:
   a base;
   a lure retainer connected to said base, said lure retainer comprising:
   a substantially perpendicular post; and
   a channel barrier extending from said post;
   wherein said post defines a notch in the side of said post for securing one segment of a lure above said base while a second segment of the lure rests on said base alongside said channel barrier.

2. A container according to claim 1, wherein said base is flat.

3. A container according to claim 1, wherein said channel barrier extends substantially perpendicularly from said post.

4. A container according to claim 1, wherein said post is connected substantially perpendicularly to said base.

5. A container according to claim 1, wherein said channel barrier is connected substantially perpendicularly to said base.

6. A container according to claim 1, wherein the side of said post defines a second notch therein.

7. A container according to claim 1, wherein said insert comprises one or more additional lure retainers positioned beside said lure retainer and connected substantially perpendicularly to said base, thereby defining a respective channel between each pair of channel barriers, wherein a respective lure retainer holds one segment of a lure above said base as another segment of the lure lies within a channel.

8. A container according to claim 1, further comprising a partition extending between opposite sections of said sidewall, thereby dividing the container into two portions.

9. A container according to claim 1, wherein said sidewall comprises a plurality of pairs of substantially vertical ribs defining pairs of aligned slots across said bottom from one another.

10. A container according to claim 9, wherein said insert further comprises an end wall connected substantially perpendicularly to said base, said end wall comprising a substantially vertical rail opposite said base on the outside of said end wall, wherein said rail slides between a pair of vertical ribs on said sidewall to hold said insert within said container.

11. A container according to claim 10, wherein said end wall comprises a second substantially vertical rail opposite said base on the outside of said endwall.

12. A container according to claim 11, wherein said insert further comprises a second end wall connected to the end of said base opposite said first end wall.

13. A container according to claim 12, wherein said second end wall comprises a third substantially vertical rail opposite said base on the outside of said second end wall.

14. A container according to claim 13, wherein said second end wall comprises a fourth substantially vertical rail opposite said base on the outside of said second end wall.

15. A container according to claim 14, wherein the pairs of rails on each end wall removably slide between corresponding pairs of ribs on said sidewall to hold said insert in place within the container.

* * * * *